US009672039B2

(12) United States Patent
Jackson

(10) Patent No.: US 9,672,039 B2
(45) Date of Patent: *Jun. 6, 2017

(54) REGISTER FILE HAVING A PLURALITY OF SUB-REGISTER FILES

(71) Applicant: Imagination Technologies Limited, Kings Langley (GB)

(72) Inventor: Hugh Jackson, Sydney (AU)

(73) Assignee: Imagination Technologies Limited, Kings Langley (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/842,983

(22) Filed: Sep. 2, 2015

(65) Prior Publication Data

US 2016/0253175 A1    Sep. 1, 2016

Related U.S. Application Data

(63) Continuation of application No. 14/157,805, filed on Jan. 17, 2014, now Pat. No. 9,304,934.

(30) Foreign Application Priority Data

Jan. 24, 2013    (GB) .................................. 1301285.1

(51) Int. Cl.
*G06F 12/00*    (2006.01)
*G06F 9/30*    (2006.01)
(Continued)

(52) U.S. Cl.
CPC ........ *G06F 9/30123* (2013.01); *G06F 9/3012* (2013.01); *G06F 9/30141* (2013.01);
(Continued)

(58) Field of Classification Search
CPC .................. G06F 9/3012; G06F 9/3838; G06F 2212/452; G06F 9/30123; G06F 9/30141;
(Continued)

(56) References Cited

U.S. PATENT DOCUMENTS 5,222,240 A    6/1993   Patel
5,826,055 A    10/1998  Wang et al.
(Continued)

FOREIGN PATENT DOCUMENTS

CN    1501292 A    6/2004
WO    00/33176 A1   12/2000

OTHER PUBLICATIONS

Hironaka et al. "Superscalar processor with multi-bank register file" Innovative Architecture for Future Generation High-Performance Processors and Systems, 2005, 2005, S. 1-10.—ISSN 1537-3223. http://ieeexplore.ieee.org/xpls/abs_all.jsp?arnumber=1587820.

(Continued)

*Primary Examiner* — Mark Giardino, Jr.
(74) *Attorney, Agent, or Firm* — Vorys, Sater, Seymour and Pease LLP; Vincent M DeLuca

(57) ABSTRACT

Register files for use in an out-of-order processor that have been divided into a plurality of sub-register files. The register files also have a plurality of buffers which are each associated with one of the sub-register files. Each buffer receives and stores write operations destined for the associated sub-register file which can be later issued to the sub-register file. Specifically, each clock cycle it is determined whether there is at least one write operation in the buffer that has not been issued to the associated sub-register file. If there is at least one write operation in the buffer that has not been issued to the associated sub-register file, one of the non-issued write operations is issued to the associated sub-register file. Each sub-register file may also have an arbitration logic unit which resolves conflicts between read and write operations that want to access the associated sub-register file in the same cycle by prioritizing read operations unless a conflicting write instruction has reached commit time.

20 Claims, 10 Drawing Sheets

(51) Int. Cl.
*G06F 9/38* (2006.01)
*G06F 12/0875* (2016.01)
*G06F 13/00* (2006.01)
*G06F 13/28* (2006.01)

(52) U.S. Cl.
CPC .......... *G06F 9/3802* (2013.01); *G06F 9/384* (2013.01); *G06F 9/3838* (2013.01); *G06F 9/3855* (2013.01); *G06F 9/3857* (2013.01); *G06F 12/0875* (2013.01); *G06F 2212/452* (2013.01)

(58) Field of Classification Search
CPC ... G06F 9/3857; G06F 9/3855; G06F 12/0875
See application file for complete search history.

(56) References Cited

U.S. PATENT DOCUMENTS 6,615,338 B1   9/2003   Tremblay et al.

2003/0037221 A1   2/2003   Gschwind et al.
2004/0073779 A1   4/2004   Hokenek et al.
2006/0039203 A1   2/2006   Chu et al.
2006/0095743 A1   5/2006   Srinivasan et al.
2006/0174066 A1   8/2006   Bridges et al.
2009/0150649 A1   6/2009   Abella et al.

OTHER PUBLICATIONS

Wallace et al. "A Scalable Register File Architecture for Dynamically Scheduled Processors" Proceedings of the 1996 Conference on Parallel Architectures and Compilation Techniques, 1996, 1996, S. 179-184.—ISSN 1089-795X. http://ieeexplore.ieee.org/xpl/abstractCitations.jsp?arnumber=552666.

Alpha 21264. IWikipedia, the free encyclopedia. Bearbeitungsstand: Jan. 16, 2013. URL: http://en.wikipedia.org/w/index.php?title=Alpha_21264&oldid=533425945.

Register file. In: Wikipedia, the free encyclopedia. Bearbeitungsstand Dec. 27, 2012. URL: http://en.wikipedia.org/w/index.php?title=Register_file&oldid=530049537.

REGISTER FILE HAVING A PLURALITY OF SUB-REGISTER FILES

BACKGROUND

In modern superscalar processors, there are a large number of pipelines all trying to read from and write to a shared register file. However, it is difficult to implement a shared register file with a large number of read and write ports without reducing the clock speed.

One method to resolve this issue has been to implement register file caching. This uses multiple caches (unrelated to the memory caches in the system) to reduce the bandwidth on the shared register file. In such systems the number of writes to the register can be reduced using a write back caching system as physical registers can be removed from the cache when they are retired. However, these systems require some form of management to migrate data between caches which do not currently reside in the shared register file.

The embodiments described below are not limited to implementations which solve any or all of the disadvantages of known processors.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Described herein are register files for an out-of-order processor that have been divided into a plurality of sub-register files. The register files also have a plurality of buffers which are each associated with one of the sub-register files. Each buffer receives and stores write operations destined for the associated sub-register file which can be later issued to the sub-register file. Specifically, each scheduling cycle (e.g. clock cycle) it is determined whether there is at least one write operation in the buffer that has not been issued to the associated sub-register file. If so, one of the non-issued write operations is issued to the associated sub-register file. Each sub-register file may also have an arbitration logic unit which resolves conflicts between read and write operations that want to access the associated sub-register file in the same scheduling cycle (e.g. clock cycle) by prioritizing read operations unless a conflicting write operation has reached commit time.

A first aspect provides a register file for an out-of-order processor, the register file comprising: a plurality of sub-register files, each sub-register file comprising at least one physical register; and a plurality of buffers, each buffer being associated with a sub-register file and configured to: receive and store write operations destined for the associated sub-register file; receive and store a write value for each write operation stored in the sub-register file, once a write value has been received for a particular write operation that write operation becomes a waiting write operation; determine, each clock cycle, if there is at least one waiting write operation in the buffer; and if there is at least one waiting write operation in the buffer select one of the waiting write operations and issue the selected write operation to the associated sub-register file.

A second aspect provides an out-of-order processor comprising: a register file according to the first aspect; and a decoding and renaming stage, the decoding and renaming stage being configured to: receive a fetched instruction; assign any architectural register referred to in a write operation of the fetched instruction a sub-register file and a physical register of the assigned sub-register file; and rename the architectural register with an indicator of the assigned sub-register file and an indicator of the assigned physical register.

A third aspect provides a method of reading and writing to a register file of an out-of-order processor, the register file comprising a plurality of sub-register files, each sub-register file comprising at least one physical register, the method comprising: receiving at one of a plurality of buffers a write operation destined for an associated sub-register file; storing the received write operation in the buffer; receiving at the buffer a write value for the write operation; storing the received write value in the buffer in association with the write operation making the write operation a waiting write operation; each clock cycle, determining if there are any waiting write operations in the buffer; and if there is at least one waiting write operation in the buffer, selecting one of the waiting write operations and issuing it to the associated sub-register file.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

This acknowledges that firmware and software can be separately used and valuable. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

Figure 1:
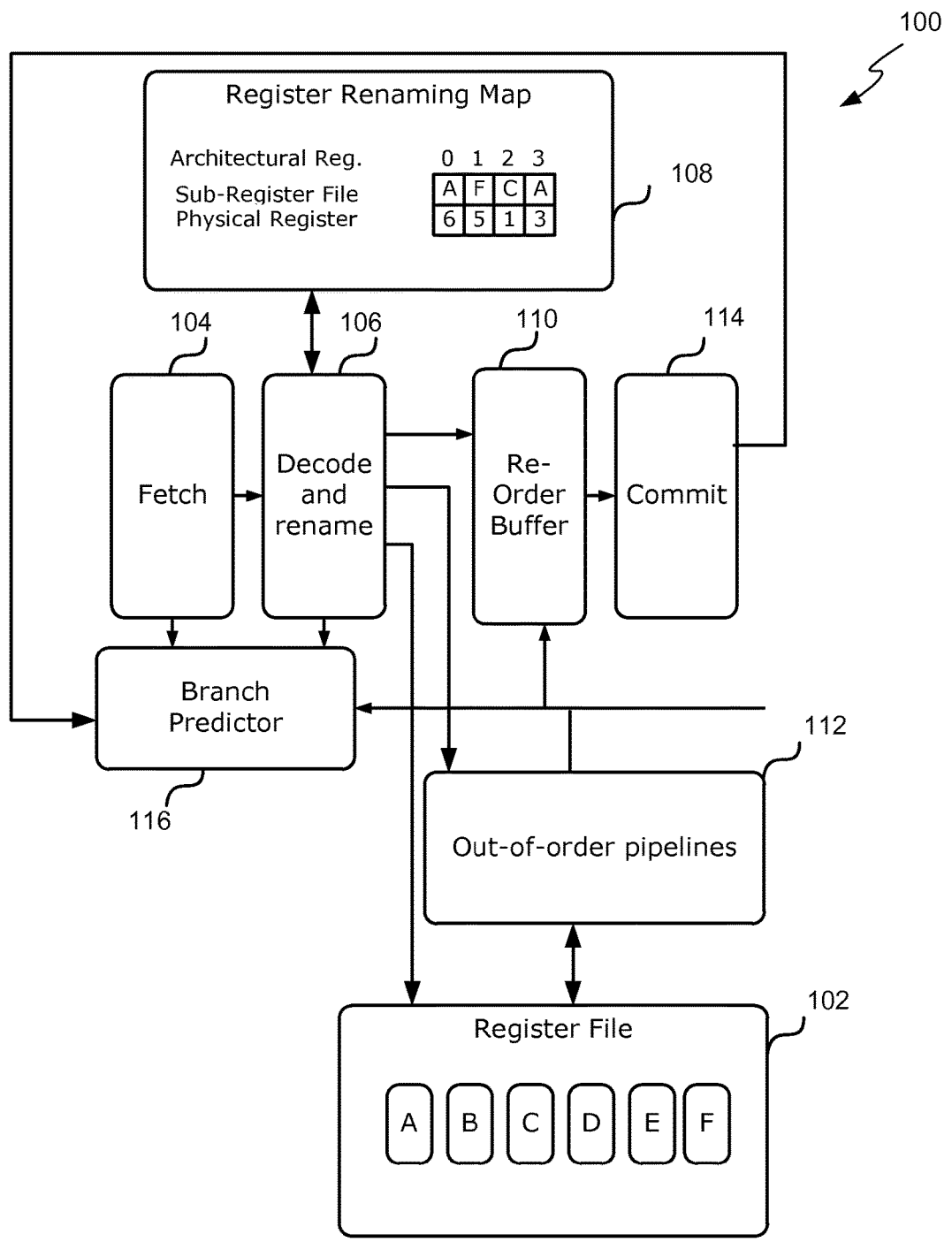
FIG. 1 is a schematic diagram of an example single-threaded out-of-order processor.

Common reference numerals are used throughout the figures to indicate similar features.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

Embodiments described herein relate to techniques for reducing the number of read and write ports to a shared register file used in an out-of-order processor. Specifically, in the embodiments described herein the register file is divided into a plurality of smaller discrete sub-register files, each with its own buffer. Each sub-register file comprises a portion of the physical registers of the register file. During the renaming stage each architectural register is assigned a specific sub-register file and a physical register within that sub-register file. Writes to each sub-register file are then collected in the corresponding buffer and trickled out into the sub-register file.

Reference is now made to FIG. 1 which illustrates a single-threaded out-of order processor 100 wherein a shared register file 102 is divided into a plurality of smaller, discrete sub-register files each with its own buffer. Each sub-register file comprises a portion of the physical registers of the register file. In the example shown in FIG. 1, the register file 102 is divided into six sub-registers files A, B, C, D, E and F, however, it will be evident to a person of skill in the art that the register file 102 may have more or fewer sub-register files. An example register file 102 will be described in more detail in reference to FIG. 2.

Although the processor 100 of FIG. 1 comprises a single shared register file 102, in other examples the processor may comprise multiple shared register files (e.g. a shared register file for floating point architectural registers and a shared register file for integer architectural registers). In these examples, one or more of the shared register files may be configured in a similar manner as the shared register file 102 of FIG. 1.

The processor 100 comprises a fetch stage 104 configured to fetch instructions from a program (in program order) as indicated by a program counter (PC) and a decode and renaming stage 106 arranged to interpret the instructions and perform register renaming. Each instruction may comprise a register write operation; one more register read operations; and/or an arithmetic or logical operation. A register write operation writes to a destination register and a register read operation reads from a source register. During the decode and renaming stage, each architectural register referred to in an instruction (e.g. each source and destination register) is replaced (or renamed) with a physical register.

For write operations, each architectural register (e.g. destination register) is allocated/assigned a specific sub-register file and a physical register within that sub-register file. In some cases the sub-register files are allocated to architectural registers on a round-robin basis (e.g. A, B, C, D, E, F, A, B, C, D, E, F, A . . . etc.). In some cases, each instruction is allocated/assigned a specific sub-register file regardless of whether the instruction comprises a write operation. Where the instruction does not comprise a write operation, the allocation is ignored. In other cases, only instructions comprising a write operation are allocated/assigned a specific sub-register file.

Any allocation may be stored in a register renaming map 108 which is a data structure showing the mapping between each architectural register and the sub-register file and physical register most recently allocated. Then, for read operations the correct physical register for a particular architectural register (e.g. source register) can be determined from the register renaming map 108.

In the example of FIG. 1, the register renaming map 108 comprises four entries indicating the sub-register file and physical register identifiers, indexed by the architectural register identifiers. For example, architectural register 0 currently maps to sub-register file A, physical register 6; architectural register 1 currently maps to sub-register file F, physical register 5; architectural register 2 currently maps to sub-register file C, physical register 1; and architectural register 3 currently maps to sub-register file A, physical register 3.

When an instruction passes through the decode and renaming stage 106, it is inserted into a reorder buffer 110 (ROB) and any write operation within the instruction is stored in the register file 102 buffer associated with the appropriate sub-register file. At this point the write operation is not ready to be issued to the appropriate sub-register file as the data to be written is unknown.

The re-order buffer 110 is a buffer that enables the instructions to be executed out-of-order, but committed in-order. The re-order buffer 110 holds the instructions that are inserted into it in program order, but the instructions within the ROB can be executed out of sequence by a plurality of out-of-order pipelines 112.

In some examples, the re-order buffer 110 can be formed as a circular buffer having a head pointing to the oldest instruction in the ROB 110, and a tail pointing to the youngest instruction in the ROB 110. In other words, instructions are output from the head of the ROB 110, and the head is incremented to the next instruction in the ROB. The instructions stored in the re-order buffer 110 may be indexed by an ROB ID which specifies the order of the instruction in the re-order buffer.

The out-of-order pipelines 112 typically each access the shared register file 102 to perform reads of and/or writes to the physical registers. When the out-of-order pipelines wish to perform a write operation, the value to be written is provided to the register file 102 by the out-of-order pipelines 112. The value to be written is then stored in the appropriate register file 102 buffer along with the corresponding write operation. Once the write value has been received and stored in the buffer for a particular write operation, the write operation is ready to be issued to the appropriate sub-register file. The ready write operations in each buffer are then trickled out to the associated sub-register file.

Once executed, instructions are output from the re-order buffer 110 in program order to a commit stage 114. The commit stage 114 commits the results of the instructions to the register/memory. The commit stage 114 commits N instructions per clock cycle where N is based on the configuration of the processor 100. For example a four-way superscalar processor may commit four instructions per clock cycle. In another example, a three-way dual-threaded processor may commit six instructions per clock cycle.

The processor 100 may also comprise a branch predictor 116, which is configured to predict which direction the program flow will take in the case of instructions known to cause possible flow changes, such as branch instructions. Branch prediction is useful as it enables instructions to be speculatively executed by the processor 100 before the outcome of the branch instruction is known. The branch predictor 116 can receive inputs from the fetch stage 104 and decode and renaming stage 106 relating to new instructions, and input from the out-of-order pipelines 112 and commit stage 114.

When the branch predictor 116 predicts the program flow accurately, this improves performance of the processor. However, if the branch predictor 116 does not correctly predict the branch direction, then a misprediction occurs which needs to be corrected before the program can continue. To correct a misprediction, the speculative instructions sent to the ROB 110 are abandoned, and the fetch stage 104 starts fetching instructions from the correct program branch.

Figure 2:
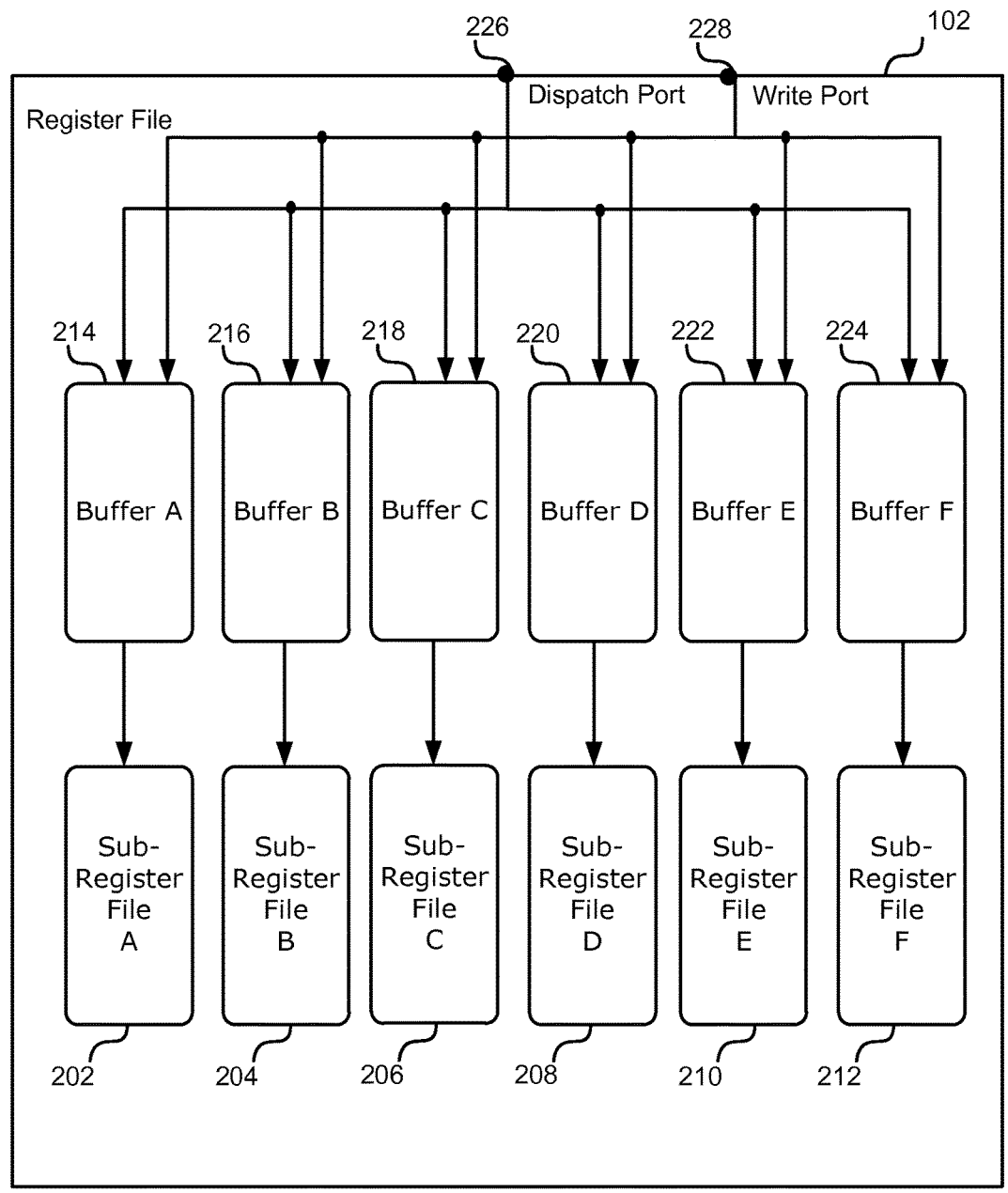
FIG. 2 is a schematic diagram of an example register file of FIG. 1.

Reference is now made to FIG. 2 which illustrates an example register file 102 of FIG. 1. The register file 102 is divided into a plurality of smaller discrete sub-register files 202-212. The example register file 102 of FIG. 2 is divided into six sub-register files 202-212; however, it will be evident to a person of skill in the art that the register file may have more or fewer sub-register files.

In some cases the number of sub-register files 202-212 is equal to the number of instructions that can be committed by the commit stage 114 per clock cycle. For example, a four-way superscalar processor which may issue four instructions per clock cycle may have a register file that is divided into four sub-register files. Similarly, a three-way dual-threaded processor which may issue six instructions per clock cycle may have a register file that is divided into six sub-register files.

The register file 102 also comprises one buffer 214-224 for each sub-register file 202-212. Any write operations to a particular sub-register file 202-212 are stored in the corresponding buffer 214-224 and written at a later time to the sub-register file 202-212. Each buffer 214-224 comprises a component or set of components (not shown), such as hardware registers (e.g. flip-flops), for storing write operations, and a logic unit (not shown) for retrieving write operations from the component or set of components.

In some cases each buffer 214-224 has a similar structure to the ROB 110 of FIG. 1. Specifically, each buffer 214-224 may be implemented as a circular buffer with a head and a tail.

In some cases the sum of the size of the buffers 214-224 may be equal to the size of the ROB 110. This allows the buffers 214-224 to hold any number of outstanding write operations, ensuring that the buffers 214-224 don't overflow. The size of the ROB 110 may be divided equally so that each of the buffers is the same size. In other cases the cumulative size of the buffers 214-224 may be greater than the size of the ROB 110.

In some cases, the write operations are stored in the buffers 214-224 in the order in which they are received. Since the write operations are typically provided to the buffers 214-224 by the decode and renaming stage 106 in program order the write operations may be stored in the buffers 214-224 in program order.

In other cases, the write operations are stored in the buffers 214-224 in an order specified by IDs associated with the write operations. For example, the write operations may be provided to the register file with the ROB ID of the associated instruction which allows the write operations be placed in the buffer in the same order as the associated instructions in the ROB 110 (e.g. in program order).

In cases where there are six sub-register files 202-212 and the sub-register files 202-212 are allocated to each instruction on a round-robin basis the write operation associated with every $6^{th}$ instruction in the ROB 110 is stored in buffer A. For example, if an instruction is placed in position 0 of the ROB 110 the corresponding write operation may be placed in position 0 of, for example, buffer A 214. The write operations corresponding to the instructions in positions 1 to 5 of the ROB 110 may then be placed in position 0 of buffers B to F 216-224 respectively. The write operations corresponding to the instructions in positions 6 to 11 of the ROB 110 may then be placed in position 1 of buffers A to F 214-224 respectively.

Accordingly, the specific buffer for a write operation may be determined by performing a modulo X operation on the received ID (e.g. ROB ID) where X is the number of sub-register files 202-212. In the example shown in FIG. 2 there are six sub-register files thus a modulo 6 operation may be performed on the received ID (e.g. ROB ID) to determine the specific buffer for storing the write operation. An integer-divide operation may then be performed on the ID (e.g. ROB ID) to determine the position or slot in the buffer for the write operation. As is known to those of skill in the art, an integer-divide operation divides the integer portion of a number by a number without the remainder. For example, a write operation with an ID of 9 may be put in buffer D (9 modulo 6=3) in slot 1 (9 integer divide 6=1)

Since modulo and integer-divide operations are hardware intensive, if X is a power of two then the position or slot in the buffer for the write operation may be determined by dropping Y bits from the received ID (e.g. ROB ID) where Y is log (X) divided by log (2). Where X is not a power of two then a hardware lookup table may be used to determine the position (e.g. buffer index) from the ID (e.g. ROB ID).

Storing the write operations in the buffer in program order allows the values to be written to the registers to be received by the buffers 214-224 in any order and placed in the buffer in program order. Once the write operations are organized in program order they can easily be issued to the associated sub-register file 202-212 in program order.

In some cases each write operation in a buffer 214-224 is issued to the corresponding sub-register file 202-212 at commit time at the latest. This is desirable because after this time there is a chance that the data in the buffer may be overwritten by a subsequent write operation. In other cases write operations may be allowed to be issued to the corresponding sub-register file 202-212 after commit time.

Since there are N instructions committed in each clock cycle, in the worst case scenario all N committed instructions will have written to a register in the last clock cycle (e.g. commit time for the instructions). It is desirable to have all N write operations associated with a committed instruction written to their corresponding sub-register files 202-212 in the same clock cycle (e.g. the commit cycle) so that the data in the buffers related to these write operations is not subsequently overwritten in the next clock cycle.

In cases where the register file 102 is divided into N sub-register files 202-212 (e.g. as shown in FIG. 2) and the sub-register files 202-212 are allocated to the instructions in program order on a round-robin basis, each of the committed instructions will have written to a different sub-register file thus allowing all N write operations to be issued to their corresponding sub-register files 202-212 in the same clock cycle. In cases where the number of sub-register files 202-212 is less than N, the processor 100 may be configured to stall a particular commit when all the write operations associated with the committed instructions cannot be written to the sub-register files 202-212 in the same cycle.

In some cases (e.g. as shown in FIG. 2) each sub-register file 202-212 only has one read/write port. In these cases each sub-register file may be implemented in Random Access Memory (RAM) instead of flip-flops saving on area and power for large register files. In other cases one or more of the sub-register files 202-212 may have multiple input ports.

Figure 3:
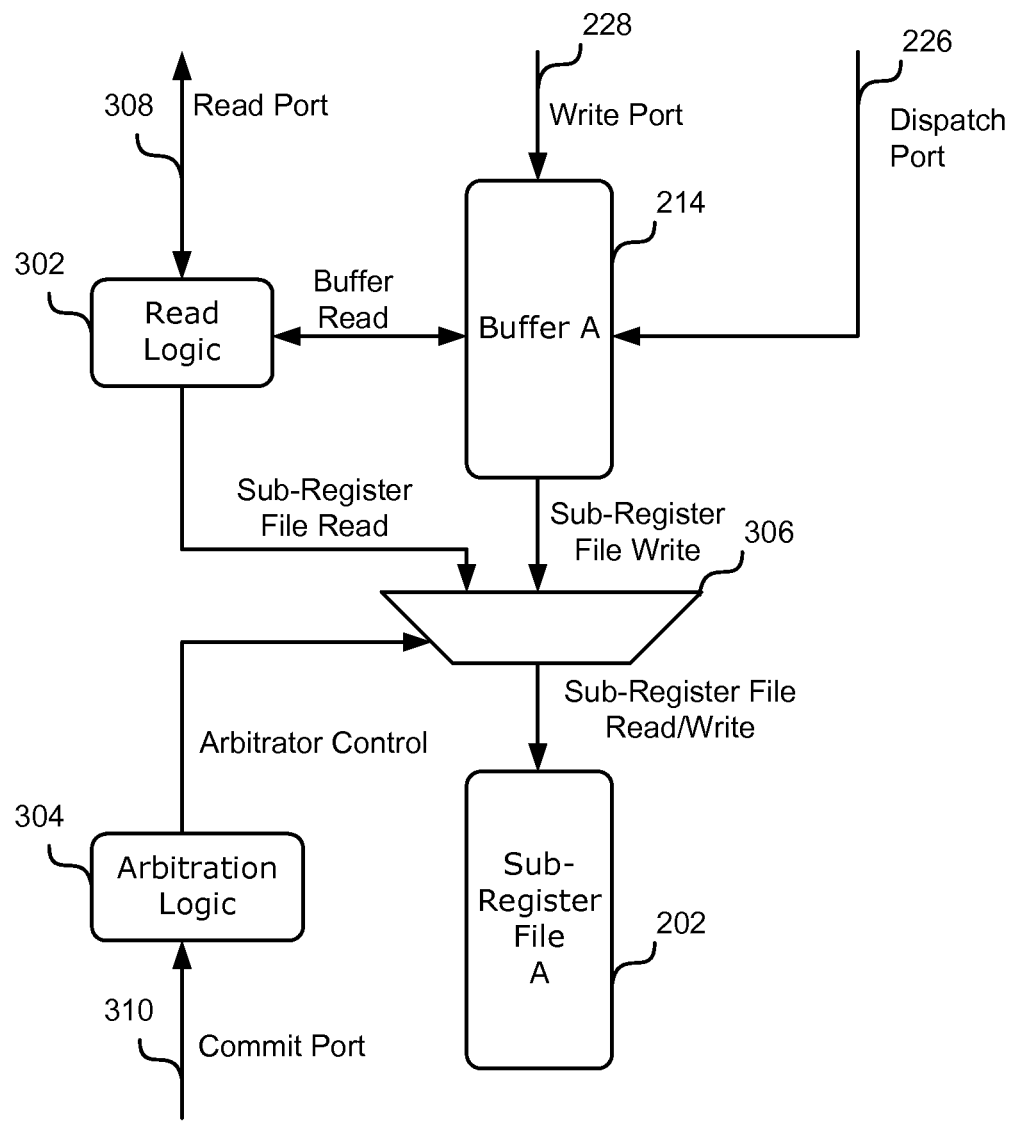
FIG. 3 is a schematic diagram of example logic units for controlling read/write access to a sub-register file of FIG. 2.

Reference is now made to FIG. 3 which illustrates example logic units (read logic unit 302 and arbitration logic unit 304) for controlling access (read and writes) to a sub-register file 202.

Although FIG. 3 shows the logic units 302 and 304 for a single sub-register file 202 it will be evident to a person of skill in the art that similar logic units may be used to control access to each of the other sub-register files. In some cases there may be a single read logic unit 302 that controls reads all the sub-register files.

The buffer 214 receives write operations for the sub-register file 202 from the decode and renaming stage 106 on a dispatch port 226 and stores the received write operations in the buffer 214. Each write operation received from the decode and renaming stage 106 typically specifies the register to be written to (e.g. register number), but does not specify the data to be written to the register.

In some cases the write operations are stored in the buffer 214 in the order in which they received. Since the decode and renaming stage 106 typically provides the write operations in program order the write operations may be stored in the buffer 214 in program order.

In other cases the write operations are stored in the buffer 214 in a particular order (e.g. program order) based on IDs associated with each write operation. In some cases, the ID is the ROB ID of the corresponding instruction so that the write operations are placed in the buffer 214 in the same order (e.g. program order) as the corresponding instruction in the ROB 110. For example, as described above, if the instruction is stored at index or position 0 in the main ROB 110 then the ID may indicate that the write operation is to be stored at index or position 0 in the buffer 214.

The buffer 214 also receives a write value for each write operation stored in the buffer 214 from the out-of-order pipelines 112 on a write port 228 and stores the received write values in the buffer 214. Each write value is matched to its corresponding write operation in the buffer 214 using an ID provided with the write value. In some cases the ID is the ROB ID of the associated instruction. In other cases the ID is the register number. Once the write value for a particular write operation has been stored in the buffer 214 that particular write operation becomes a waiting write operation since it is waiting to be issued to/completed by the corresponding sub-register file. Once a waiting write operation has been issued to/completed by the corresponding sub-register file it becomes an issued or completed write operation.

Each scheduling cycle the buffer 214 determines whether there are any waiting write operations in the buffer 214. The term "scheduling cycle" is used herein to mean the time at which operations (i.e. read and/or write operations) are submitted to a sub-register file. In some cases there is a scheduling cycle each clock cycle. However, in other cases scheduling cycles may occur more or less often than each clock cycle. If there is at least one waiting write operation in the buffer 214, the buffer 214 selects one of the waiting write operations and issues it to the corresponding sub-register file 202. In some cases issuing the write operation to the corresponding sub-register file may comprise sending the selected write operation to a multiplexer 306. In other cases issuing the write operation to the corresponding sub-register file may comprise sending the selected write operation directly to the sub-register file 202.

In some cases, the buffer 214 is configured to select the oldest waiting write operation in the buffer 214. In other cases, the buffer 214 may be configured to use other criteria to select one of the waiting write operations in the buffer 214.

The read logic unit 302 is responsible for controlling reads of the sub-register file 202. Since the sub-register file 202 may not comprise the most recent updates when the read is executed (e.g. there may be write operations in the buffer 214 that have not been written to the sub-register file 202), when the read logic unit 302 receives a read operation for the sub-register file 202 on a read port 308 the read logic unit 302 may issue the read operation to both the buffer 214 and the sub-register file 202. In some cases issuing the read operation to the sub-register file 202 may comprise sending the read operation to the multiplexer 306. In other cases, issuing the read operation to the sub-register file may comprise sending the read operation to the sub-register file 202 directly.

When the buffer 214 receives the read operation from the read logic unit 302 it searches for a write operation in the buffer 214 that matches the read operation (e.g. relates to the register specified in the read operation). If the buffer 214 finds a match and the match is a waiting write operation or a completed write operation (e.g. the write value has been received for the write operation) then the buffer 214 provides the write data corresponding to the matching write operation to the read logic unit 302. The read logic unit 302 then provides the received write data to the out-of-order pipelines 112. If the buffer 214 finds a match, but the match is not a waiting write operation or a completed write operation (e.g. the write value has not been received for the write operation) then the buffer 214 may return an error message to the read logic unit 302 indicating that the register is not ready to be read. The read logic unit 302 may then relay the error message to the out-of-order pipelines 112. If the buffer 214 is unable to find a match then the buffer 214 may return an error message to the read logic unit 302 indicating that the read failed. The read logic unit 302 may then wait to receive the read data from the sub-register file 202 and relay this to the out-of-order pipelines 112.

When the cumulative size of the buffers 214-224 is equal to the size of the ROB 110 the buffer 214 may only find one write operation in the buffer 214 that matches the read operation (e.g. relates to the register specified in the read operation). Where, however, the cumulative size of the buffers 214-224 is greater than the size of the ROB 110 the buffer 214 may find more than one write operation in the buffer 214 that matches the read operation (e.g. relates to the register specified in the read operation). Where the buffer 214 identifies more than one matching write operation, the buffer 214 may be configured select the write data from the newest write operation (as determined by its location in the buffer 214) and provide this to the read logic unit 302.

In some cases, the read logic unit 302 may be configured to issue the read operation to the buffer and sub-register files in the same scheduling cycle (e.g. clock cycle). In other cases, the read logic 302 may be configured to issue the read operation to the buffer 214 and sub-register file 202 on different scheduling cycles (e.g. clock cycles). For example, the read logic 302 may be configured to issue the read operation to the buffer 214 on a first clock cycle and only issue the read operation to the sub-register file 202 on a subsequent clock cycle if no match for the specified register was found in the buffer 214. In these cases the total number of sub-register file reads may be reduced, but those reads which are not resolved by the data in the buffer may take longer to complete.

Where the sub-register file 202 has only a single input port (as shown in FIGS. 2 and 3), only one read or write of the sub-register file 202 can be completed in a single scheduling cycle (e.g. clock cycle). In these cases the arbitration logic unit 304 is responsible for resolving conflicts between reads and writes that are issued to the same sub-register file in the same scheduling cycle (e.g. both a read operation and a write operation are received at the multiplexer 306 in the same clock cycle).

In some cases, the arbitration logic unit 304 may be configured to control the multiplexer 306 so that if there is a conflict—e.g. both a read and a write operation received at the multiplexer 306 in the same clock cycle—the read is given priority (e.g. the read is selected and sent to the sub-register file 202) unless it is commit time for the write operation. Where it is commit time for the write operation, the write operation is given priority (e.g. the write operation is selected and sent to the sub-register file 202). Where there is no conflict—e.g. where there is only a single read or a write operation received at the multiplexer 306—then the read or write operation received at the multiplexer 306 is selected and sent to the sub-register file 202.

In some cases the arbitration logic unit 304 may determine whether a write operation has reached commit time based on data received from the commit stage 114 on a commit port 310. The data provided on the commit port 310 may comprise a list of instructions that are being committed during the current clock cycle. For example, the data provided on the commit port 310 may comprise a list of ROB IDs that have committed. In some cases these IDs are analyzed to determine the specific buffer(s) they relate to and the specific position they are stored (e.g. index) in the buffer(s). The arbitration logic unit 304 may then compare the index identified by the ROB ID to the index for the write operation to determine if they match. If they match then it may be determined that the write operation has reached commit time.

In other cases, the ROB IDs received from the commit stage 114 are converted to work out which sub-register file they are associated with and they are compared with a counter for the specific sub-register file to determine if the write operation has reached commit time. In particular, in these cases each sub-register file may comprise logic (not shown) that is incremented each time the sub-register file is written to and is decrement when an instruction associated with the sub-register file is committed. Each counter essentially counts how many completed write operations have not reached commit time. When a particular sub-register file receives data from the commit stage 114 indicating that an instruction associated with the sub-register file is being committed and the counter for that particular sub-register file is zero then the arbitration logic unit 304 may determine that it is commit time for the write operation.

After a write operation has been written to the sub-register file 202 it may remain in the buffer 214 until it has been committed during the commit phase 114 or until the buffer 214 slot is required for a new write operation. This allows reads to be done from the buffer 214 instead of the sub-register file 202 since it is typically easier and faster to do a buffer read than a sub-register file read. However, once a write operation has been written to the sub-register file 202 a flag may be set in the buffer 214 indicating that the write operation has already been written to the sub-register file 202. This ensures that the write operation will not be selected again to be written to the sub-register file 202.

The buffers 214-224, read logic unit 302, arbitration logic unit 304 and multiplexer 306 described herein may be implemented using any suitable hardware logic.

Although FIGS. 2 and 3 show sub-register files with a single input port, in other embodiments each sub-register file may comprise two input ports. The first input port may be used to read from the sub-register file and the second input port may be used to write to the sub-register file. In these embodiments the register file may not have arbitration logic units to deal with conflicts between read and writes to the same sub-register file. This may reduce read delays over the single-ported sub-register file embodiment shown in FIGS. 2 and 3.

Figure 4:
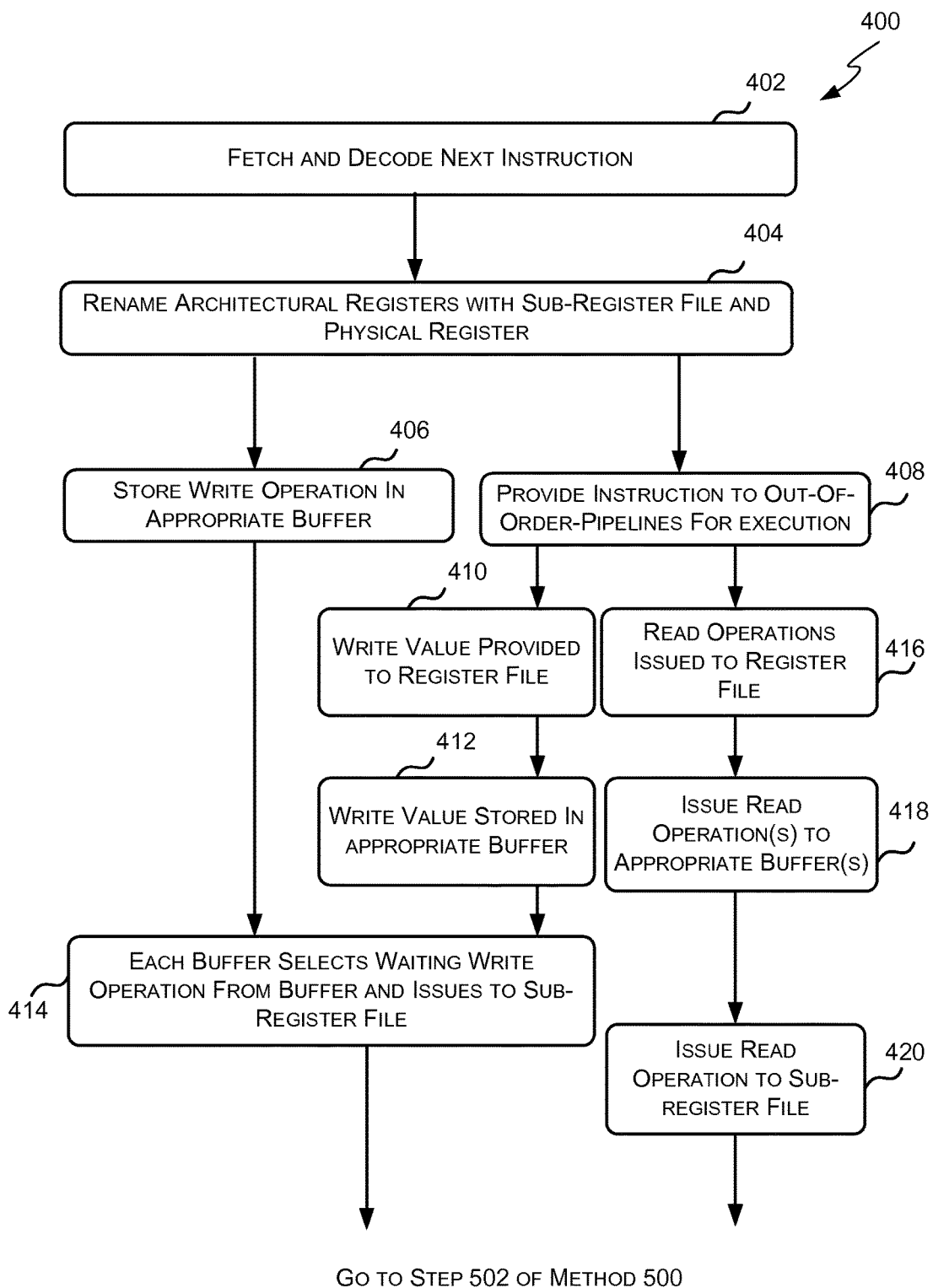
FIG. 4 is a flowchart of an example method for writing to and reading from the register file of FIG. 2.

Reference is now made to FIG. 4, which illustrates an example method 400 for writing data to and reading data from a register file which has been sub-divided into a plurality of smaller, discrete sub-register files. At step 402, an instruction is fetched and decoded. As described above, each instruction may comprise a register write operation; one or more register read operations; and/or an arithmetic or logical operation. Once the instruction has been fetched and decoded, the method 400 proceeds to step 404.

At step 404, any architectural register referred to in the instruction is replaced or renamed with a physical register. For write operations, replacing the architectural register (e.g. destination register) with a physical register may comprise assigning a particular sub-register file and a physical register within that sub-register file to the architectural register. In some cases the sub-register files are assigned on a round-robin basis. For example, if there are six sub-register files labelled A to F as shown in FIG. 2 the sub-register files may be assigned in the following order A, B, C, D, E, F, A, B, C . . . etc. Any assignment of a sub-register file and physical register to an architectural register may be stored in the register renaming map 108 as described above in reference to FIG. 1.

For read operations, replacing the architectural register (e.g. source register) with a physical register may comprise determining the particular sub-register file and a physical register most recently assigned to the architectural register and replacing the architectural register with that sub-register file and physical register. In some cases, the particular sub-register file and physical register most recently assigned to the architectural register is obtained from a register renaming map (e.g. register renaming map 108). Once the architectural registers have been renamed to a physical register, the method 400 proceeds to steps 406 and 408.

At step 406, any write operation in the instruction is dispatched to the register file 102 where it is stored in the appropriate buffer (e.g. the buffer associated with the sub-register file assigned in step 404). As described above, in some cases each write operation may be provided to the buffer with an ID (e.g. ROB ID) which notifies the buffer what position or slot in the buffer the write operation is to be stored. In other cases, the write operations are stored in the buffer in the order (e.g. program order) in which they are received. Once the write operation has been stored in the appropriate buffer, the method 400 proceeds to step 414.

At step 408, the instruction is provided to the out-of-order pipelines 112 for execution. At step 410 the out-of-order pipelines 112 provide the write value for any write operation in the instruction to the register file 102. At step 412 the write value provided in step 410 is stored in the appropriate buffer with the associated write operation. The specific buffer and write operation may be identified by information provided to the register file 102 along with the write value. In some cases the information may comprise the specific sub-register and register numbers. In the other cases the information may comprise an ID (e.g. ROB ID of the associated instruction) that can be used to determine the specific buffer and slot. Once a write value has been received and stored for a write operation, the write operation is said to be a waiting write operation. Once the write value has been received and stored the method 400 proceeds to step 414.

At step 414, each buffer determines whether it comprises any waiting write operations. If a buffer comprises at least one waiting write operation, the buffer selects one of the waiting write operations and issues the selected write operation to the corresponding sub-register file. In some cases issuing the selected write operation to the sub-register file comprises providing it to a multiplexer (e.g. multiplexer 306 of FIG. 3) where it waits to be sent to the sub-register file on the next available scheduling cycle (e.g. clock cycle). In some cases the next available scheduling cycle (e.g. clock cycle) is the current scheduling cycle.

As described above in reference to FIG. 3, in some cases each write operation in the buffer may be associated with a flag or bit which indicates whether or not the write operation has been written to the associated sub-register file. In these cases the buffer may be configured to only select a write operation whose flag or bit indicates that it has not already been written to the corresponding sub-register file. In some cases the buffer may be configured to select the oldest write operation in the buffer that is waiting to be written to the sub-register file. In other cases, the buffer may use other criteria to select a waiting write operation. Once a waiting write operation has been selected and issued to the sub-register file, the method 400 may proceed to step 502 of method 500.

At step 416, any read operations forming part of the instruction are issued to the register file 102. Once the read operation(s) have been issued to the register file 102 the method 400 proceeds to step 418.

At step 418, the read operation(s) is/are issued to the appropriate buffer(s) (e.g. the buffer(s) associated with the sub-register file determined in step 404). Once all read operations have been issued to the appropriate buffer(s), the method proceeds to step 420.

At step 420, the read operation(s) is/are issued to the appropriate sub-register file (e.g. the sub-register file determined in step 404). In some cases issuing the read operation to the sub-register file comprises issuing the read operation to a multiplexer (e.g. multiplexer 306 of FIG. 3) associated with the sub-register file where it waits to be sent to the appropriate sub-register file.

In some cases steps 418 and 420 are completed in the same scheduling cycle (e.g. clock cycle). Specifically, in some cases the read operation is issued to the appropriate buffer(s) (e.g. the buffer(s) associated with the sub-register file determined in step 404) and the appropriate sub-register file (e.g. the sub-register file determined in step 404) in the same scheduling cycle (e.g. clock cycle). In other cases steps 418 and 420 may be performed in different scheduling cycles (e.g. clock cycles). For example, step 418 may be completed in a first clock cycle and step 420 may only be completed in a subsequent clock cycle if is determined that the associated buffer(s) does/do not contain an entry for the register specified in the read operation. In these cases, read operations are only sent to the appropriate sub-register file if the buffer(s) cannot satisfy the request.

Once step 420 is complete, the method may proceeds to step 502 of method 500 where conflicts between reads and writes are resolved.

Figure 5:
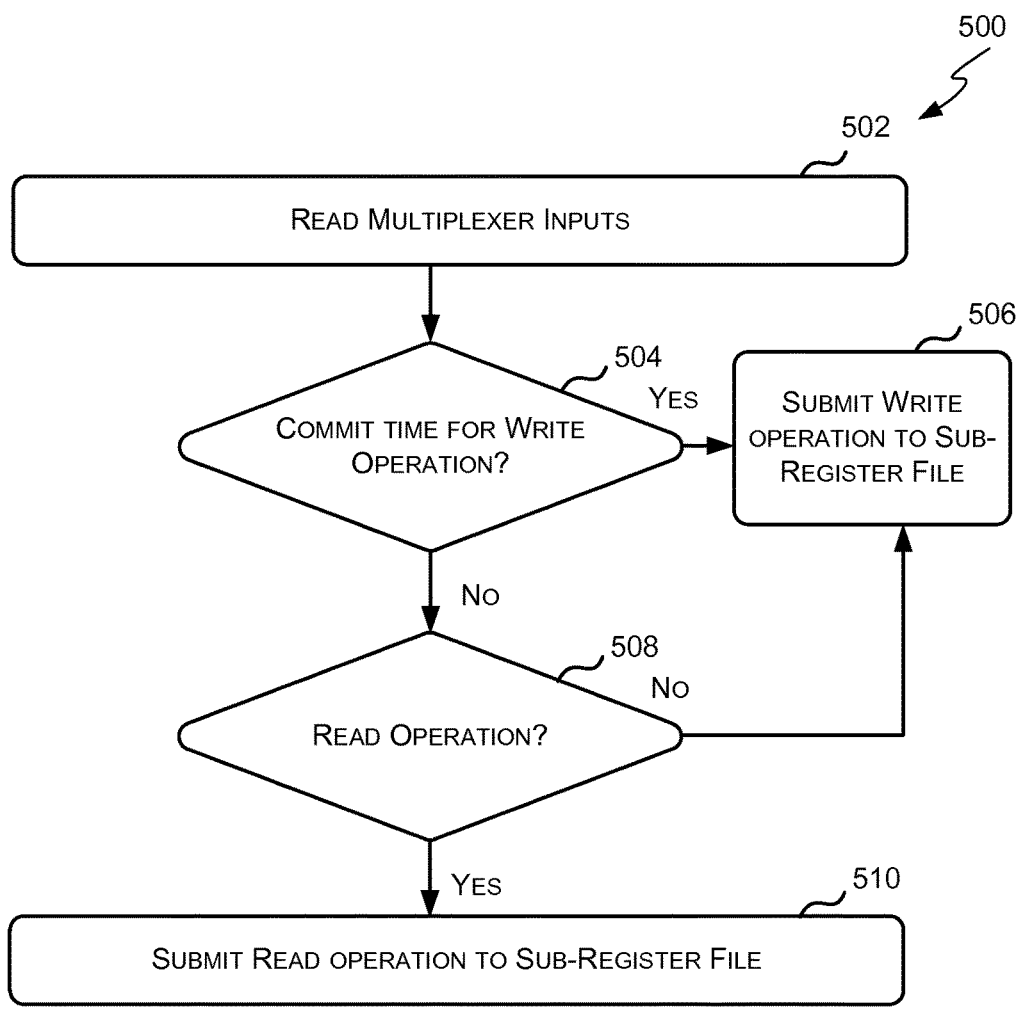
FIG. 5 is a flowchart of an example method for resolving conflicts between read and write operations issued to the same sub-register file of the register file of FIG. 2 in the same clock cycle.

Reference is now made to FIG. 5, which illustrates a method 500, which may be executed by the arbitration logic unit 304 of FIG. 3, for resolving conflicts between operations issued to the same sub-register file in the same scheduling cycle (e.g. clock cycle). At step 502, the inputs (e.g. read and/or write operations) to the multiplexer (e.g. multiplexer 306) associated with the sub-register file are read. Once the inputs to the multiplexer are read, the method 500 proceeds to step 504.

At step 504, it is determined whether it is commit time for any write operation input to the multiplexer 306. In some cases determining whether it is commit time for a write operation comprises comparing data received from the commit stage 114 to at least a portion of the write operation. For example, as described above in reference to FIG. 3 determining whether it is commit time for a write operation may comprise analyzing ROB IDs of committed instructions from the commit phase 114 to the buffer ID. In other cases, determining whether it is commit time for a write operation may comprise analyzing a counter value associated with the sub-register file. If it is determined that it is commit time for a write operation input to the multiplexer 306 then the method proceeds to step 506. If, however, it is determined that it is not commit time for a write operation input to the multiplexer 306 then the method 500 proceeds to step 508.

At step 506, the write operation that has reached commit time is submitted to the appropriate sub-register file. If there is a conflicting read operation it is considered for submission to the sub-register file in the next scheduling cycle (e.g. clock cycle). For example, in some cases it may be input into the multiplexer 306 in the next scheduling cycle (e.g. clock cycle). If there is no conflicting write operation that has reached commit time in the next scheduling cycle (e.g. clock cycle), it will be submitted to the appropriate sub-register file in the next scheduling cycle (e.g. clock cycle). Once the write operation has been submitted to the appropriate sub-register file the method 500 ends.

At step 508, it is determined whether there is a read operation that has been input to the multiplexer 306. If there is a read operation that has been input to the multiplexer 306 then the method 500 proceeds to step 510 where the read operation is submitted to the sub-register file. If there is no read operation that has been input to the multiplexer 306 then the method 500 proceeds to step 506 where the write operation is submitted to the sub-register file.

At step 510, the read operation is submitted to the appropriate sub-register file. If there is a conflicting write operation it may be considered for submission to the sub-register file in the next scheduling cycle (e.g. clock cycle) if none of the older write operations in the same buffer become waiting write operations in the next scheduling cycle (e.g. the next clock cycle). For example, in some cases the conflicting write operation will be selected from the buffer in the next clock cycle and input into the multiplexer 306 for issue to the sub-register file. If there is no conflicting read operation in that clock cycle then it will be submitted to the appropriate sub-register file. Once the read operation has been submitted to the appropriate sub-register file the method 500 ends.

This method 500 may be repeated each scheduling cycle (e.g. each clock cycle).

This method 500 gives priority to read operations unless it is commit time for a conflicting write operation. Accordingly, the likelihood of a read having to wait for a write may be reduced by issuing write operations to the multiplexer 306 (and thus the sub-register file) as soon as possible instead of waiting until commit time.

While method 500 discloses giving priority to read operations unless it is commit time for a conflicting write operation, in other embodiments the arbitration logic unit 304 may be configured to give priority to read operations unless a conflicting write operation is about to be overwritten in the buffer. In these embodiments, the method executed by the arbitration logic unit 304 may be similar to method 500, but instead of determining in step 504 whether it is commit time for a write operation, it may be determined whether the write operation input to the multiplexer 306 is about to be overwritten by a new write operation dispatched from the decode and renaming stage. Only if the write operation input to the multiplexer 306 is about to be overwritten by a new write operation is the write operation given priority over a conflicting read operation.

As described above, in some cases the decode and renaming stage provides the ROB ID to the register file 102 in addition to providing the write operation. In these cases the arbitration logic unit 304 may be configured to determine whether the write operation input to the multiplexer 306 is about to be overwritten by a new write operation received from the decode and renaming stage by determining the buffer slot of the new write instruction from the ROB ID and comparing this to the buffer slot (e.g. buffer index) of the write instruction input to the multiplexer 306. If the two buffer slots match then the new write operation will overwrite the write operation input to the multiplexer 306 in the current clock cycle. Accordingly, to ensure that the data for the write operation input to the multiplexer 306 is not lost, the write operation input to the multiplexer 306 is submitted to the sub-register file.

In other cases, where the buffers are implemented as circular buffers (e.g. with a head and tail), the arbitration logic unit 304 may be configured to determine a write operation is about to be overwritten if the buffer slot after the tail of the circular buffer contains a waiting write operation. In particular, if the write operation is situated in the slot after the tail of the circular buffer then any new write operation dispatched to the buffer from the decode and renaming stage will be written to that slot and will overwrite the write operation situated therein. Accordingly, to ensure that the write operation is not overwritten before it is submitted, it is submitted to the sub-register file.

In cases where the cumulative size of the buffers is equal to the size of the ROB 110 this overwrite method allows more reads to be prioritized thus improving system performance over the commit-time method 500 described in reference to FIG. 5. For example, future instructions may be waiting on data from read operations before they can execute thus prioritizing read operations over write operations may speed up the execution of a program. In contrast, delaying the submission of write operations to the sub-register file may not affect other instructions since the write data can be read from the buffers instead.

Further system improvements over the commit-time method 500 may be realized where the cumulative size of the buffers is greater than the size of the ROB 110. In particular, by increasing the size of the buffers, the time between a write operation becoming a waiting write operation and having to submit that write operation to the sub-register file is increased. This allows more time for the write operation to be submitted to the sub-register file and thus decreases the chances of having to stall a read operation for a write operation.

FIGS. 6 to 10 will be used to illustrate how the techniques and methods described herein may be applied to a multi-threaded out-of-order processor.

Figure 6:
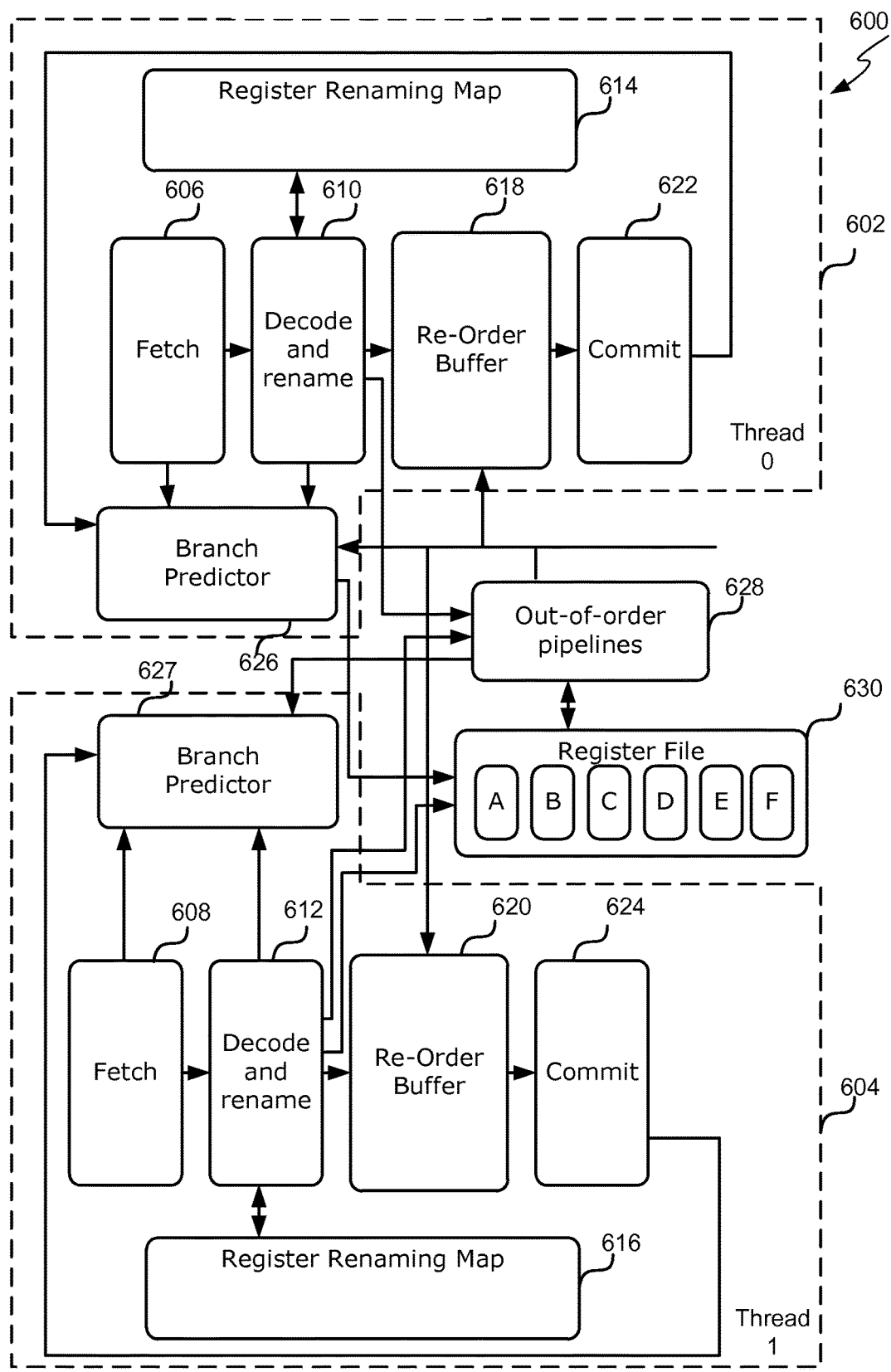
FIG. 6 is a schematic diagram of an example multi-threaded out-of-order processor.

Reference is now made to FIG. 6 which illustrates a schematic of a multi-threaded out-of order processor 600. The processor 600 comprises two threads 602 and 604 which will be referred to herein as thread 0 and thread 1 respectively. Each thread 602 and 604 comprises a fetch stage 606 or 608, a decode and renaming stage 610 or 612 which maintains a register renaming map 614 or 616, a re-order buffer 618 or 620, a commit stage 622 or 624 and a branch predictor 626 or 627 as described above in reference to FIG. 1. The threads 602 and 604 share out-of-order pipelines 628 and one or more register files 630.

Figure 7:
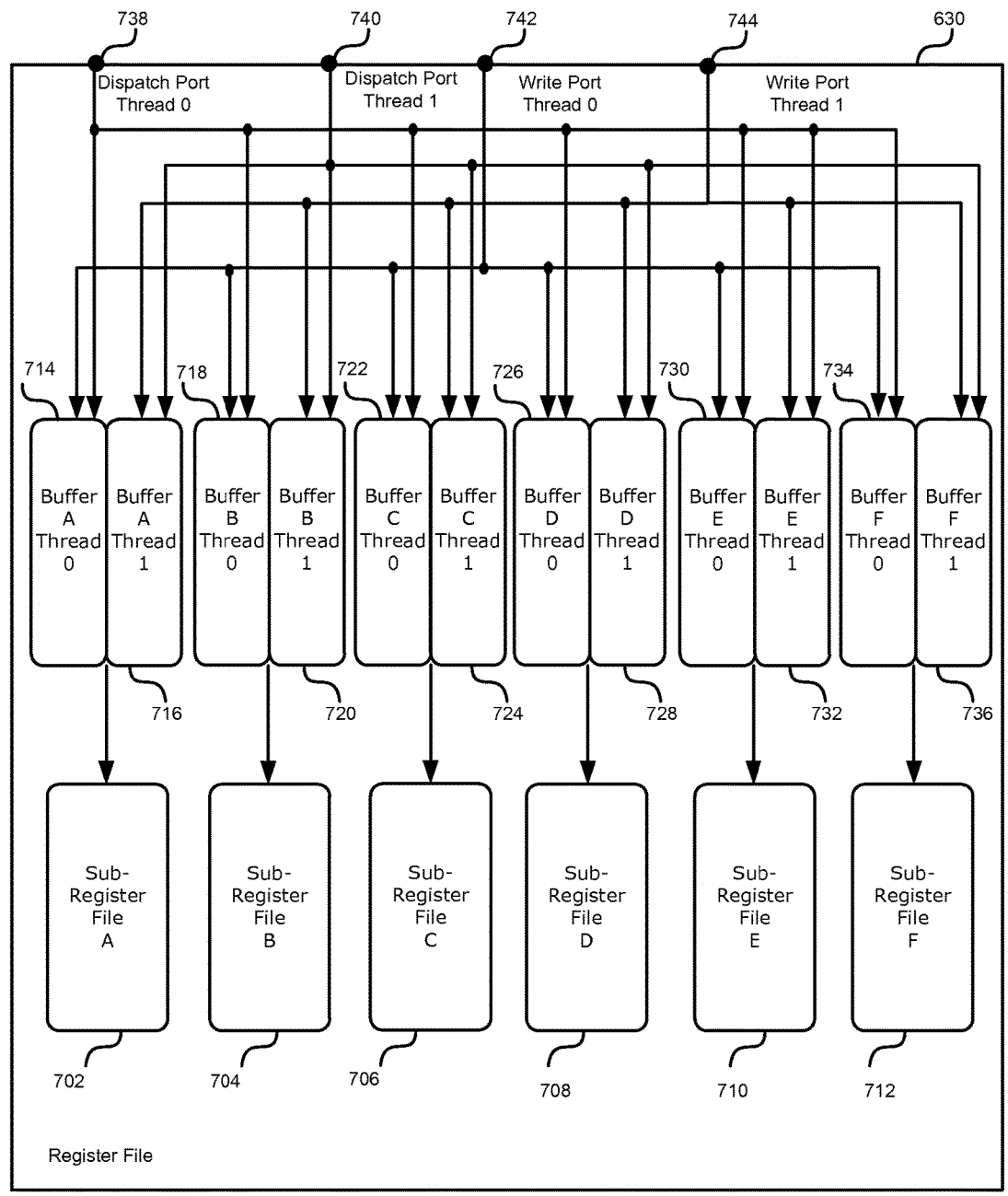
FIG. 7 is a schematic diagram of an example register file of FIG. 6.

Reference is now made to FIG. 7 which illustrates an example register file 630 of FIG. 6. The register file 630 of FIG. 7 is similar to the register file 102 of FIG. 2 in that it is divided into a plurality of smaller, discrete sub-register files 702-712. Like the example register file 102 of FIG. 2, the example register file 630 of FIG. 7 is divided into six sub-register files 702-712; however, it will be evident to a person of skill in the art that the register file 630 may have more or fewer sub-register files.

In some cases the number of sub-register files is equal to the number of instructions that can be committed by the commit stages 622 and 624 per clock cycle. For example, a four-way superscalar processor which may issue four instructions per clock cycle may have a register file that is divided into four sub-register files. Similarly, a three-way dual-threaded processor which may issue six instructions per clock cycle may have a register file that is divided into six sub-register files.

Since each thread 602 and 604 may commit at different speeds, the register file 630 of FIG. 7 has a plurality of buffers 714-736 for each sub-register file 702-712. Specifically each sub-register file 702-712 has one buffer for each thread in the processor 600. The example multi-threaded processor 600 shown in FIG. 6 comprises two threads 602 and 604 (thread 0 and thread 1) thus the register file 630 has two buffers 714-736 for each sub-register file 702-712. It will be evident to a person of skill in the art that the register file 630 may have more or fewer buffers per sub-register file depending on the number of threads in the processor.

Any writes to a particular sub-register file 702-712 are stored in the corresponding buffers 714-736 and written at a later time to the sub-register file 702-712.

In some cases each buffer 714-736 has a similar structure to the ROBs 618 and 620 of FIG. 6. Specifically, each buffer 714-736 may be implemented as a circular buffer which has a head and a tail.

In some cases the sum of the sizes of the buffers 714-736 for a particular thread is equal to the size of the corresponding ROB 618 or 620. This allows the buffers 714-736 to hold any number of outstanding write operations, ensuring that the buffers 714-736 don't overflow. The ROB 618 or 620 size may be divided equally amongst the buffers 714-736 for that thread so that all of the buffers 714-726 for that thread are the same size. Since the two ROBs 618 and 620 may have different sizes, the buffers for different threads may be different sizes. In other cases the cumulative size of the buffers 714-736 for a particular thread may be greater than the size of the corresponding ROB 618 or 620.

In some cases, the write operations are stored in the buffers 714-736 in the order in which they are received. Since the write operations are typically provided to the buffers 714-736 by the decode and renaming stages 610 and 612 in program order the write operations may be stored in the buffers 714-736 in program order.

In other cases, the write operations are stored in the buffers 714-736 in an order specified by IDs associated with the write operations. For example, each write operation may be provided to the register file with the ROB ID of the associated instruction which allows the write operation be placed in the buffer in the same order as the associated instruction in the ROB 618 or 620 (e.g. in program order).

Storing the write operations in the buffers in program order allows the write values for the write operations to be received by the buffers 714-736 out of order, but written to the corresponding sub-register file in-order.

Figure 8:
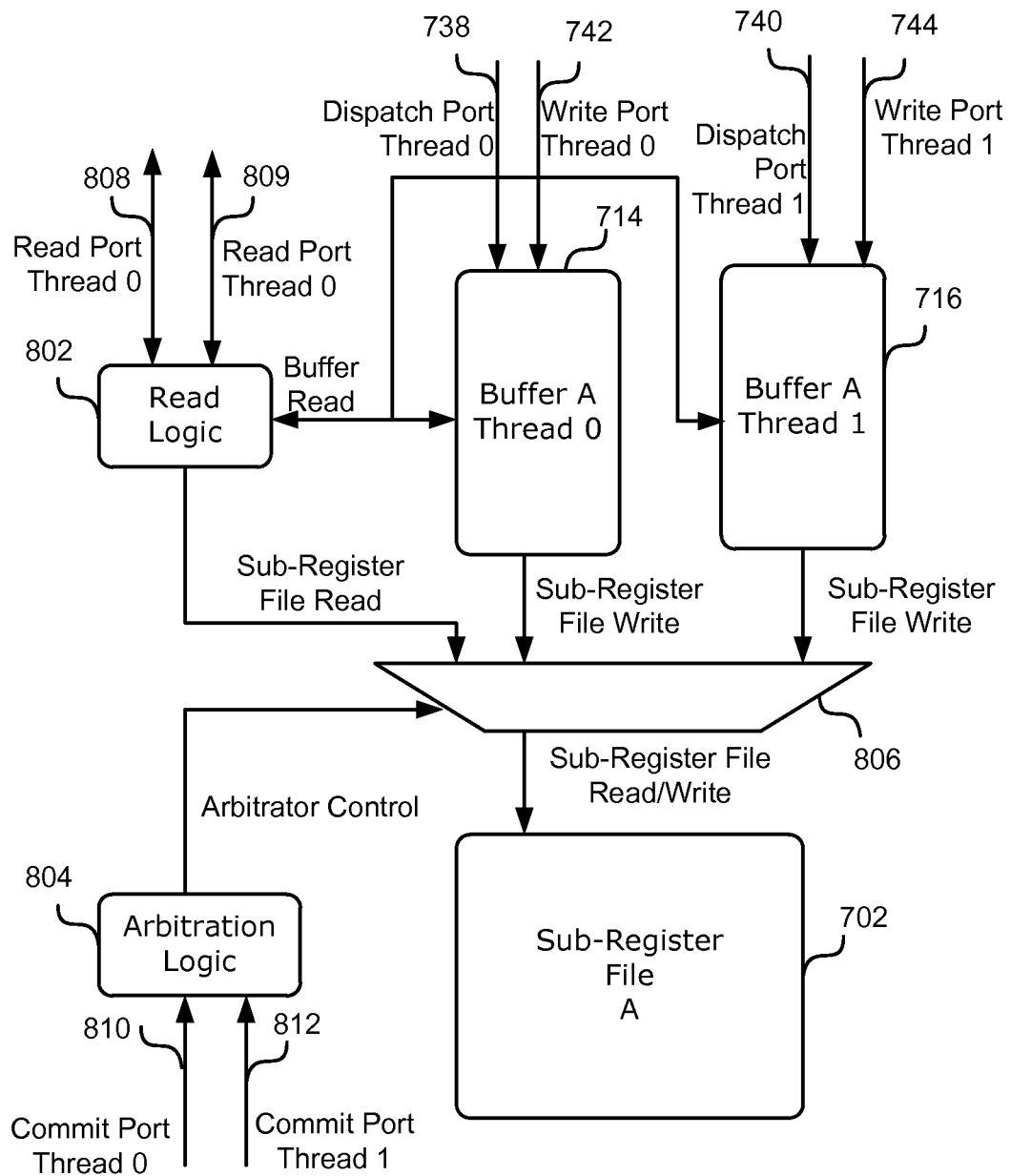
FIG. 8 is a schematic diagram of example logic units for controlling read/write access to a sub-register file of FIG. 7.

Reference is now made to FIG. 8 which illustrates logic units (read logic unit 802 and arbitration logic unit 804) for controlling access (reads and writes) to a sub-register file 702. Although FIG. 8 shows the logic units for a single sub-register file 702 it will be evident to a person of skill in the art that similar logic units may be used to control access to each of the other sub-register files. In some cases there may be a single read logic unit 802 that controls reads of all the sub-register files.

Each buffer 714 and 716 receives write operations for the sub-register file 702 from a particular thread on a dispatch port 738 or 740. For example, the first buffer 714 may be configured to receive write operations from the first thread 602 (thread 0) and the second buffer 716 may be configured to receive write operations from the second thread 604 (thread 1). Upon receiving a write operation on the dispatch port 738 or 740 the buffer 714 of 716 stores the received write operation in the buffer 714 or 716. In some cases storing the received write operation comprises storing the register number of the register to be written to.

In some cases, the write operations are stored in the buffers 714 and 716 in the order in which they are received. Since the write operations are typically provided to the buffers 714 and 716 by the decode and renaming stages 610 and 612 in program order the write operations may be stored in the buffers 714 and 716 in program order.

In other cases, the write operations are stored in the buffers 714 and 716 in an order specified by IDs associated with the write operations. For example, each write operation may be provided to the register file with the ROB ID of the associated instruction which allows the write operations be placed in the buffer in the same order as the associated instructions in the ROB 110 (e.g. in program order).

Each buffer 714 and 716 also receives a write value for each write operation stored in the buffer 714 from the out-of-order pipelines 628 on a write port 742 or 744. The buffer 714 or 716 then stores the received write values in the buffer 714 or 716 alongside its corresponding write operation. Since the instructions may be executed out of order the write values may be received from the out-of-order pipelines 628 out of order. Each write value is matched to its corresponding write operation in the buffer 714 or 716 using an ID provided with the write value. In some cases the ID is the ROB ID of the associated instruction. In other cases the ID is the physical register number. Once the write value for a specific write operation has been stored in the buffer 714 or 716 the write operation is considered to be waiting.

Each scheduling cycle (e.g. clock cycle) each buffer 714 and 716 determines whether it comprises any waiting write operations. If a buffer 714 or 716 determines that it comprises at least one waiting write operation then it selects one of the waiting write operations and issues the selected write operation to the sub-register file 702. In some cases issuing the selected sub-register file comprises providing the selected write operation to a multiplexer 806. In some cases, the buffers 714 and 716 are configured to select the oldest write operation waiting in the buffer 714 or 716. In other cases, the buffers 714 and 716 may be configured to select a waiting write operation using other criteria.

The read logic unit 802, similar to the read logic unit 302 of FIG. 3, is responsible for controlling reads of the sub-register file 702. Since the sub-register file 702 may not comprise the most recent updates when the read is executed (e.g. there may be write operations in one or more of the associated buffers 714 and 716 that have not been written to the sub-register file 702), when the read logic unit 802 receives a read operation on a read port 808 or 809 the read logic unit 802 may be configured to issue the read operation to at least one buffer 714 and 716 and the sub-register file 702 (via the multiplexer 806).

In some cases, the read logic unit 802 may be configured to issue each received read operation to both of the corresponding buffers 714 and 716. However, in other cases the thread number may be provided to the read logic unit 802 along with the read operation. In these cases, the read logic unit 802 may only issue the read operation to one of the buffers 714 or 716 (e.g. the buffer corresponding to the identified thread). For an example, a read operation from thread 0 may only be issued to the first buffer 714 instead of both to the first and second buffers 714 and 716.

Although FIG. 8 shows a single read port 808 or 809 for each thread 602 and 604, in other cases there may be multiple read ports (e.g. four) per thread or there may be multiple read ports (e.g. eight) that are shared between the threads. This allows each thread to send one or more read operations to the read logic unit 802 in a single clock cycle.

Since the read logic unit 802 may receive more than one read operation from a thread or from multiple threads in the same cycle, the read logic unit 802 may be configured to buffer or store the read operations until it is able to trickle them out. In some cases, if the read logic unit 802 has run out of space for storing a new read operation the read logic unit 802 may be configured to return a failure message to the out-of-order pipelines 628. The failure message may comprise a single acknowledge bit that indicates if the read operation has been accepted or not. Where the read logic unit 802 does not have the ability to buffer or store read operations the read logic unit 802 may return a failure message to the out-of-order pipelines 628 upon receiving a read operation if it is unable to perform the received read operations (e.g. it has received multiple read operations in the same cycle).

The read logic unit 802 may be able to issue multiple read operations to each buffer 714 and 716 in the same clock cycle. However, the read logic unit 802 may only be able, based on the number of input ports to the sub-register file 702, to issue only one read operation to a sub-register file 702 in a particular clock cycle.

When a buffer 714 or 716 receives a read operation from the read logic unit 802 the buffer 714 or 716 looks for a write operation in the buffer 714 or 716 that matches the read operation (e.g. relates to the register specified in the read operation). If the buffer 714 or 716 finds a match and the match is a waiting write operation or a completed write operation then the buffer 714 or 716 provides the write data corresponding to the matching write operation to the read logic unit 802 which provides it to the out-of-order pipelines 628. If the buffer 714 or 716 finds a match, but the match is not a waiting write operation or a completed write operation (e.g. the write value has not been received from the out-of-order pipelines 628 for the write operation) then the buffer 714 or 716 may return an error message to the read logic unit 802 indicating that the register is not ready to be read. The read logic unit 802 may then relay the error message to the out-of-order pipelines 628. If the buffer 714 or 716 is unable to find a match then the buffer 714 or 716 may return an error message to the read logic unit 802 indicating that the read failed. The read logic unit 802 may then wait to receive the read data from the sub-register file 702 and relay this to the out-of-order pipelines 628.

When the cumulative size of the buffers 714-736 for a particular thread is equal to the size of the corresponding ROB 618 or 620 the buffer 714 or 716 may only find one write operation in the buffer 714 or 716 that matches the read operation (e.g. relates to the register specified in the read operation). Where, however, the cumulative size of the buffers 714-736 for a particular thread is greater than the size of the corresponding ROB 618 or 620 the buffer 714 or 716 may find more than one write operation in the buffer 714 or 716 that matches the read operation (e.g. relates to the register specified in the read operation). Where the buffer 714 or 716 identifies more than one matching write operation, the buffer 714 or 716 may be configured to select the write data from the newest write operation (as determined by its location in the buffer 714 or 716) and provide this to the read logic unit 802.

In some cases the read logic unit 802 may be configured to issue the read operation to one or more of the buffers 716 and 718 and sub-register file 702 in the same scheduling cycle (e.g. clock cycle). In other cases, the read logic 802 may be configured to issue the read operation to one or more buffers 716 and 718 and the sub-register file in different scheduling cycle (e.g. clock cycles). For example, the read logic unit 802 may be configured to issue the read operation to one or more buffers 714 and 716 on a first clock cycle and only issue the read operation to the sub-register file 702 on a subsequent clock cycle if no match for the specified register was found in the associated buffers 714 and 716. As described above in reference to FIG. 3, in these cases the total number of sub-register file accesses may be reduced, but it may take longer to complete read operations that are not resolved by the data in the associated buffers 714 and 716.

In cases where the sub-register file 702 has only one input port (as shown in FIGS. 7 and 8) only one read or write to the sub-register file 702 can be completed in a single scheduling cycle (e.g. clock cycle). In these cases the arbitration logic unit 804 is responsible for resolving conflicts between read and writes that want to access the sub-register file 702 in the same scheduling cycle (e.g. clock cycle). In some cases the arbitration logic 804 may determine that there is a conflict by counting the number of inputs to the multiplexer 806 (e.g. more than 1 input=conflict, 1 or less inputs=no conflict).

In some cases, the arbitration logic unit 804 may be configured to control the multiplexer 806 so that if there is a conflict any read is given priority unless commit time for any conflicting write has passed, or it is commit time for any conflicting write.

Where commit time for any conflicting write operation has passed, then the write operation for which commit time has passed is given priority over a read operation and any other write operation. Specifically, where commit time has already passed for a write operation, that write operation is submitted to the sub-register file 702. Where the sub-register files are assigned on a round-robin basis and there are N sub-register files (where N is the number of instructions that can be committed in a clock cycle) there will only be one write operation for which commit time has passed in any clock cycle. Accordingly, in these cases any write operation for which commit time has passed is ensured to be issued to the sub-register file 702.

Where there are no conflicting write operations for which commit time has passed, then priority is given to any conflicting write operation for which it is commit time. Where it is commit time for only one conflicting write operation, then that write operation is given priority. Specifically, the write operation for which commit time has arrived is submitted to the sub-register file 702. Where, however, it is commit time for at least two conflicting write operations then only one of those write operations can be given priority. In these cases, the arbitration logic unit 804 may select one of these write operations and submit it to the sub-register file 702. The arbitration logic unit 804 may use any suitable means for selecting the write operation to submit to the sub-register file 702. For example, in some cases the arbitration logic unit 804 may be configured to select the write operation from the thread with the most outstanding write operations. Any other conflicting write operation in which it is commit time will be given priority in the immediately following scheduling cycle (e.g. clock cycle).

Where there is no conflict—e.g. where there is only a single read or write operation received at the multiplexer 806 in a particular scheduling cycle (e.g. clock cycle)—then the read or write received at the multiplexer 806 is submitted to the sub-register file 702.

Like the arbitration logic unit 304 of FIG. 3, the arbitration logic unit 804 of FIG. 8, may determine whether a write operation has reached commit time based on data received from the commit stages 722 and 724 on commit ports 810 and 812. The data provided on the commit ports 810 and 812 may comprise a list of instructions (e.g. ROB IDs) that are being committed during the current clock cycle.

After a write operation has been written to the sub-register file 702 it may remain in the corresponding buffer 714 or 716 until it has been committed during the commit phase 622 or 624 or it has been overwritten by another write operation. This allows reads to be done from the buffers 714 and 716 instead of the sub-register file 702 since it is typically easier and faster to do a buffer read than a sub-register file read. However, once a write operation has been written to the sub-register file 702 a flag may be set in the corresponding buffer 714 or 716 indicating that the write operation has already been written to the sub-register file 702. This ensures that write operation will not be selected again to be written to the sub-register file 702.

The buffers 714-736, read logic unit 802, arbitration logic unit 804 and multiplexer 806 described herein may be implemented using any suitable hardware logic.

The method 400 described above in reference to FIG. 4 for writing to and reading from a register file is equally applicable to multi-threaded out-of-order processors (e.g. processor 600). For example, in some cases an instance of method 400 will be executed for each thread.

Figure 9:
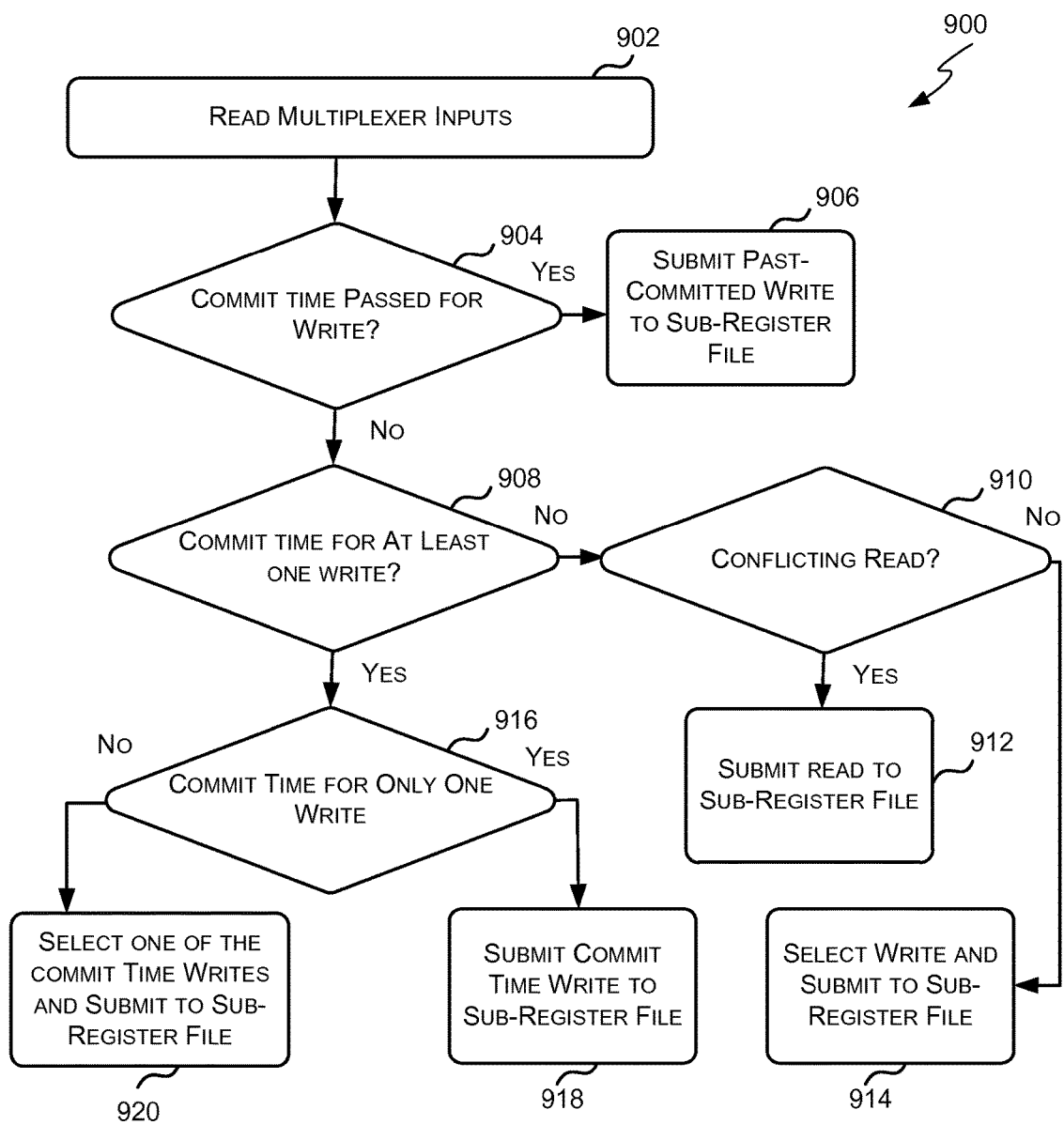
FIG. 9 is a flowchart of a first example method for resolving conflicts between read and write operations issued to the same sub-register file of the register file of FIG. 7 in the same clock cycle.

Reference is now made to FIG. 9 which illustrates a method 900, which may be executed by the arbitration logic unit 804 of FIG. 8, for resolving conflicts between operations trying to access a sub-register file in the same scheduling cycle (e.g. clock cycle) in a multi-threaded out-of-order processor (e.g. processor 600). At step 902, the inputs (e.g. read and/or write operations) to the multiplexer (e.g. multiplexer 806) associated with the sub-register file (e.g. sub-register file 702) are read. Once the inputs to the multiplexer are read, the method 900 proceeds to step 904.

At step 904, it is determined whether commit time has passed for any write operation input to the multiplexer. If so it is given priority. This situation may occur where in the previous cycle it was commit time for at least two conflicting writes. In such a situation only one conflicting write can be submitted to the sub-register file in the scheduling cycle (e.g. clock cycle) and the other conflicting write is submitted to the sub-register file in the immediately following scheduling cycle (e.g. clock cycle). If it is determined that commit time has passed for a write operation input to the multiplexer, then the method 900 proceeds to step 906. If, however, it is determined that commit time has not passed for a conflicting write operation, then the method 900 proceeds to step 908.

At step 906, the write operation for which commit time has passed is submitted to the sub-register file for execution.

At step 908, it is determined whether it is commit time for any write operation input to the multiplexer. In some cases determining whether it is commit time for a write is based on data received from the commit stages 622 and 624 to at least a portion of the conflicting write operation(s) as described above. If it is determined that it is not commit time for any write operation input to the multiplexer then the method proceeds to step 910. If, however, it is determined that it is commit time for at least one write operation input to the multiplexer then the method proceeds to step 916.

At step 910, it is determined whether there is a read operation input to the multiplexer. If so, the read operation is given priority. Specifically, if it is determined there is a read operation input to the multiplexer, the method proceeds to step 912. If, however, it is determined that there is no read operation input to the multiplexer, then the method 900 proceeds to step 914.

At step 912, the read operation is submitted to the sub-register file. The method 900 then ends.

At step 914, one of the write operations input to the multiplexer is selected and submitted to the sub-register file. The method 900 then ends.

At step 916, it is determined whether it is commit time for only one write operation input to the multiplexer. If so, that write operation is given priority. Specifically, if is determined that it is commit time for only one conflicting write operation, then the method proceeds to step 918. If, however, it is determined that it is commit time for at least two conflicting write operations then the method 900 proceeds to step 920.

At step 918, the write operation for which commit time has arrived is submitted to the sub-register file.

At step 920, one of the write operations for which commit time has arrived is submitted to the sub-register file. As described above only one operation can be submitted to the sub-register file in a particular cycle.

Any conflicting operation that is not submitted to the sub-register file in the current scheduling cycle (e.g. clock cycle) is considered for submission to the sub-register file in the next scheduling cycle (e.g. clock cycle). For example, a conflicting read operation that is not submitted to the sub-register file in the current clock cycle may be automatically input into the multiplexer in the next clock cycle and if there is no conflicting write operation that has reached or passed commit time in the next clock cycle, the read operation will be submitted to the sub-register file. Similarly, a conflicting write operation that is not submitted to the sub-register file in the current clock cycle may be selected by the buffer in the next clock cycle to be input to the multiplexer. If there is no conflicting read operation or write operation that has reached or passed commit time in that clock cycle, then the write operation will be submitted to the sub-register file. If the conflicting write has reached commit time, then in the next cycle its commit time will have passed and it will be given the highest priority and be submitted to the sub-register file.

Figure 10:
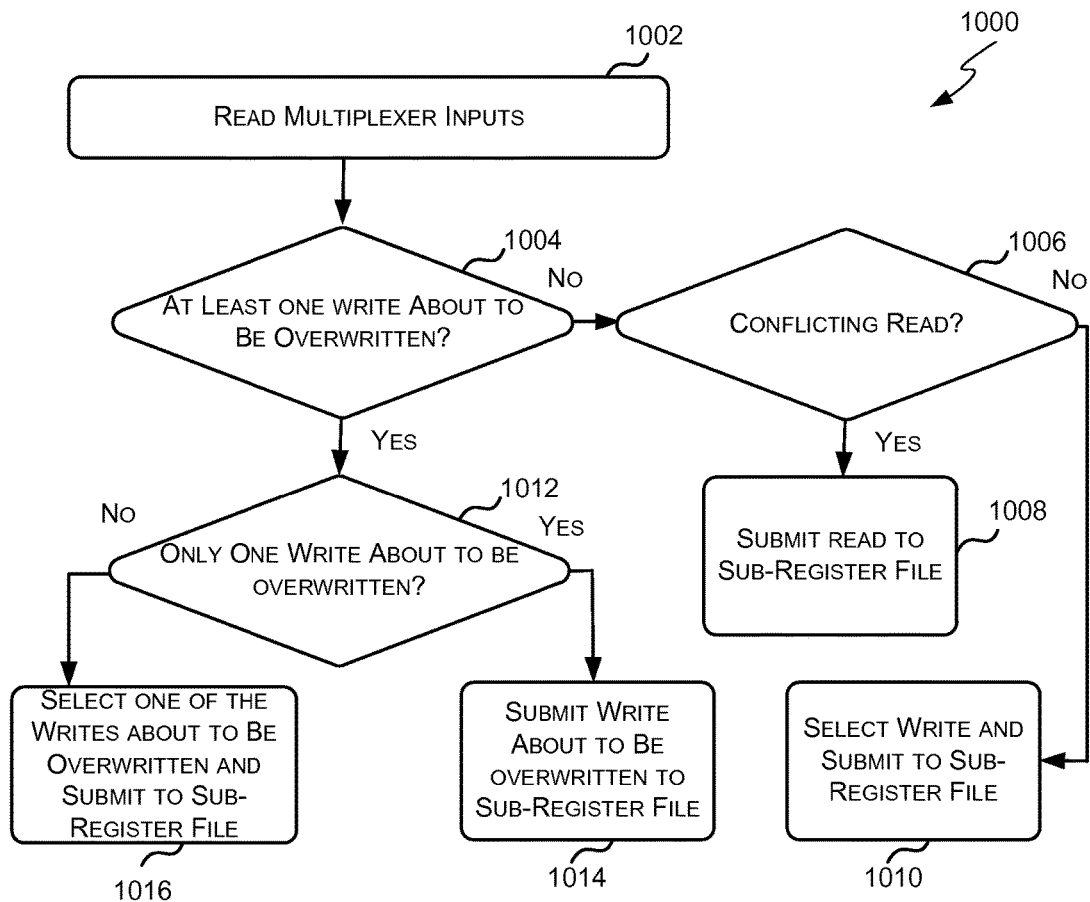
FIG. 10 is a flowchart of a second example method for resolving conflicts between read and write operations issued to the same sub-register file of the register file of FIG. 7 in the same clock cycle.

Reference is now made to FIG. 10 which illustrates a method 1000, which may be executed by the arbitration logic unit 804 of FIG. 8, for resolving conflicts between operations trying to access a sub-register file in the same scheduling cycle (e.g. clock cycle) in a multi-threaded out-of-order processor (e.g. processor 600). At step 1002, the inputs (e.g. read and/or write operations) to the multiplexer (e.g. multiplexer 806) associated with the sub-register file (e.g. sub-register file 702) are read. Once the inputs to the multiplexer are read, the method 1000 proceeds to step 1004.

At step 1004, it is determined whether any write operation input to the multiplexer is about to be overwritten. In some cases determining whether a write operation is about to be overwritten comprises determining if the write operation is situated in the buffer a predetermined number of slots after the tail of the buffer. The predetermined number of slots may be based on the number of threads in the processor. Typically the higher number of threads, the higher the predetermined number of slots. For example, if the processor has two threads the predetermined number of slots may be one, whereas if the processor has four threads the predetermined number of slots may be two.

If the write operation is situated in the buffer the predetermined number of slots after the tail, then after the buffer receives the predetermined number of new write operations from the decode and renaming stage the write operation input to the multiplexer will be overwritten. For example, if the predetermined number of slots is one, then the write operation input to the multiplexer will be overwritten when the buffer receives one new write operation. Similarly, if the predetermined number of slots is two, then the write operation input to the multiplexer will be overwritten after the buffer receives two new write operations. Accordingly, to ensure that the write operation input to the multiplexer is not overwritten before it is submitted, it is submitted to the sub-register file.

If it is determined that none of the write operations input to the multiplexer are about to be overwritten then the method 1000 proceeds to step 1006. If, however, it is determined that at least one write operation input to the multiplexer is about to be overwritten then the method proceeds to step 1012.

At step 1006, it is determined whether there is a read operation input to the multiplexer. If so, the read operation is given priority. Specifically, if it is determined there is a read operation input to the multiplexer, the method proceeds to step 1008. If, however, it is determined that there is no read operation input to the multiplexer, then the method 1000 proceeds to step 1010.

At step 1008, the read operation is submitted to the sub-register file. The method 1000 then ends.

At step 1010, one of the write operations input to the multiplexer is selected and submitted to the sub-register file. The method 1000 then ends.

At step 1012, it is determined whether only one write operation input to the multiplexer is about to be overwritten. If so, that write operation is given priority. Specifically, if is determined that only one conflicting write operation is about to be overwritten, then the method 1000 proceeds to step 1014. If, however, it is determined that at least two conflicting write operations are about to be overwritten then the method 1000 proceeds to step 1016.

At step 1014, the write operation which is about to be overwritten is submitted to the sub-register file.

At step 1016, one of the write operations about to be overwritten is submitted to the sub-register file. As described above only one operation can be submitted to the sub-register file in a particular cycle.

Any conflicting operation that is not submitted to the sub-register file in the current scheduling cycle (e.g. clock cycle) is considered for submission to the sub-register file in the next scheduling cycle (e.g. clock cycle). For example, a conflicting read operation that is not submitted to the sub-register file in the current clock cycle may be automatically input into the multiplexer in the next clock cycle and if there is no conflicting write operation that is about to be overwritten in the next clock cycle, the read operation will be submitted to the sub-register file. Similarly, a conflicting write operation that is not submitted to the sub-register file in the current clock cycle may be selected by the buffer in the next clock cycle to be input to the multiplexer. If there is no conflicting read operation or write operation that is about to be overwritten in that clock cycle, then the write operation will be submitted to the sub-register file.

In cases where the cumulative size of the buffers is equal to the size of the ROB 618 or 620 the overwrite method 1000 described in reference to FIG. 10 allows more reads to be prioritized thus improving system performance over the commit-time method 900 described in reference to FIG. 9. For example, future instructions may be waiting on data from read operations before they can execute thus prioritizing read operations over write operations may speed up the execution of a program. In contrast, delaying the submission of write operations to the sub-register file may not affect other instructions since the write data can be read from the buffers instead.

Further system improvements over the commit-time method 900 may be realized where the cumulative size of the buffers is greater than the size of the ROB 618 or 620. In particular, by increasing the size of the buffers, the time between a write operation becoming a waiting write operation and having to submit that write operation to the sub-register file is increased. This allows more time for the write operation to be submitted to the sub-register file and thus decreases the chances of having to stall a read operation for a write operation.

As with method 500, methods 900 and 1000 may be repeated each scheduling cycle (e.g. clock cycle).

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to an item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

The invention claimed is:

1. A register file for use in an out-of-order processor, the register file comprising:
   a plurality of sub-register files, each sub-register file comprising at least one physical register; and
   a plurality of buffers, each buffer being associated with a sub-register file and arranged to:
      receive write operations destined for the associated sub-register file,
      store the received write operations in the buffer,
      receive write values for write operations stored in the buffer,
      store the received write values in the buffer,
      determine, each scheduling cycle, whether there is at least one stored write operation in the buffer with a stored write value, and
      in response to determining there is at least one stored write operation in the buffer with a stored write value, select one of the write operations in the buffer with a stored write value and issue the selected write operation to the associated sub-register file.

2. The register file of claim 1, further comprising a plurality of arbitration logic units, each arbitration logic unit being associated with a sub-register file and arranged to:
   receive write operations and read operations issued to the associated sub-register file; and
   resolve conflicts between read and write operations issued to the associated sub-register file in a same cycle by prioritizing read operations unless a conflicting write operation is about to be overwritten in the buffer.

3. The register file of claim 1, further comprising a plurality of arbitration logic units, each arbitration logic unit being associated with a sub-register file and arranged to:
   receive write operations and read operations issued to the associated sub-register file; and
   resolve conflicts between read operations and write operations issued to the associated sub-register file in a same cycle by prioritizing read operations unless a conflicting write operation has reached commit time.

4. The register file of claim 3, wherein the out-of-order processor is a multi-threaded processor and each sub-register file is associated with a plurality of buffers, each associated buffer being arranged to receive and store write operations from one of a plurality of threads.

5. The register file of claim 4, wherein each arbitration logic unit is arranged to resolve conflicts between read and write operations issued to the associated sub-register file in the same cycle by prioritizing read operations unless a conflicting write operation has reached commit time or commit time for a conflicting write operation has passed.

6. The register file of claim 5, wherein each arbitration logic unit is arranged to:
   determine whether commit time has passed for at least one write operation issued to the associated sub-register file in a particular cycle;
   in response to determining that commit time has passed for at least one write operation issued to the associated sub-register file, select one of the write operations for which commit time has passed and submit the selected write operation to the associated sub-register file during the particular cycle;
   in response to determining that commit time has not passed for at least one write operation issued to the associated sub-register file in the particular cycle, determine whether commit time for at least one write operation issued to the associated sub-register file is the particular cycle;
   in response to determining that commit time for at least one write operation issued to the associated sub-register file is not the particular cycle, submit any read operation to the associated sub-register file; and
   in response to determining that commit time for at least one write operation issued to the associated sub-register file is the particular cycle, select one of the write operations for which the commit time is the particular cycle, and submit the selected write operation to the associated sub-register file.

7. The register file of claim 3, wherein commit time for a particular write operation is determined based on information received from at least one commit stage of the out-of-order processor.

8. The register file of claim 1, further comprising at least one read logic unit, each read logic unit associated with at least one sub-register file and arranged to:
   receive read operations for each associated sub-register file; and
   issue each read operation to the appropriate sub-register file and at least one buffer associated with the appropriate sub-register file.

9. The register file of claim 8, wherein each read logic unit is arranged to issue the read operation to the appropriate sub-register file only in response to determining the read operation issued to the at least one buffer associated with the appropriate sub-register file did not produce a match.

10. The register file of claim 8, wherein each read logic unit is arranged to issue the read operation to the appropriate sub-register file and the at least one buffer associated with the appropriate sub-register file in the same cycle.

11. The register file of claim 1, wherein the number of sub-register files is equal to the number of instructions that can be committed by the out-of-order processor in a single cycle.

12. The register file of claim 1, wherein each of the sub-register files is implemented in random access memory.

13. The register file of claim 1, wherein the write operations are stored in the plurality of buffers in program order.

14. The register file of claim 1, wherein each of the plurality of buffers is a circular buffer.

15. The register file of claim 1, wherein each write operation stored in a buffer is issued to the associated sub-register file at commit time at the latest.

16. An out-of-order processor comprising:
the register file as set forth in claim 1; and
a decoding and renaming stage, the decoding and renaming stage arranged to:
  receive a fetched instruction,
  assign any architectural register referred to in a write operation of the fetched instruction a sub-register file and a physical register from the assigned sub-register file, and
  rename the architectural register with an indicator of the assigned sub-register file and an indicator of the assigned physical register.

17. The out-of-order processor of claim 16, wherein the decoding and renaming stage is arranged to assign the sub-register files to architectural registers on a round-robin basis.

18. The out-of-order processor of claim 17, wherein the decoding and renaming stage is arranged to store the assignment of a sub-register file and a physical register to an architectural register in a register renaming map.

19. The out-of-order processor of claim 18, wherein the decoding and renaming stage is further arranged to:
  rename any architectural register referred to in a read operation of the fetched instruction with an indicator of the assigned sub-register file and an indicator of the assigned physical register as specified in the register renaming map.

20. A method of reading and writing to a register file of an out-of-order processor, the register file comprising a plurality of sub-register files, each sub-register file comprising at least one physical register, the method comprising:
  receiving at one of a plurality of buffers a write operation destined for an associated sub-register file;
  storing the received write operation in the buffer;
  receiving at the buffer a write value for the write operation;
  storing the received write value in the buffer in association with the write operation;
  each scheduling cycle, determining whether there is at least one stored write operation in the buffer with a stored write value; and
  in response to determining there is at least one stored write operation in the buffer with a stored write value, select one of the write operations in the buffer with a stored write value and issue the selected write operation to the associated sub-register file.

* * * * *